D. H. ELMER.
FRUIT CUTTER.
APPLICATION FILED DEC. 17, 1919.

1,342,207.

Patented June 1, 1920.

INVENTOR
David H. Elmer
BY John A. Crawsmith
HIS ATTORNEY

D. H. ELMER.
FRUIT CUTTER.
APPLICATION FILED DEC. 17, 1919.

1,342,207.

Patented June 1, 1920.
3 SHEETS—SHEET 3.

INVENTOR
David H. Elmer
BY John A. Arrowsmith
HIS ATTORNEY

UNITED STATES PATENT OFFICE.

DAVID H. ELMER, OF CENTERVILLE, CALIFORNIA.

FRUIT-CUTTER.

1,342,207.    Specification of Letters Patent.    Patented June 1, 1920.

Application filed December 17, 1919. Serial No. 345,650.

*To all whom it may concern:*

Be it known that I, DAVID H. ELMER, a citizen of the United States, and resident of Centerville, in the county of Alameda and State of California, have invented certain new and useful Improvements in Fruit-Cutters, of which the following is a specification.

My invention relates to a machine for cutting peaches and fruit of a similar nature, and it is the object of my invention to provide a machine of the character indicated that will be automatic and continuous in its operation and which involves an endless chain built up of cutting elements and mounted upon suitable actuating mechanism together with fixed means for operating the cutting blades.

In the drawings:—

Figure 1:
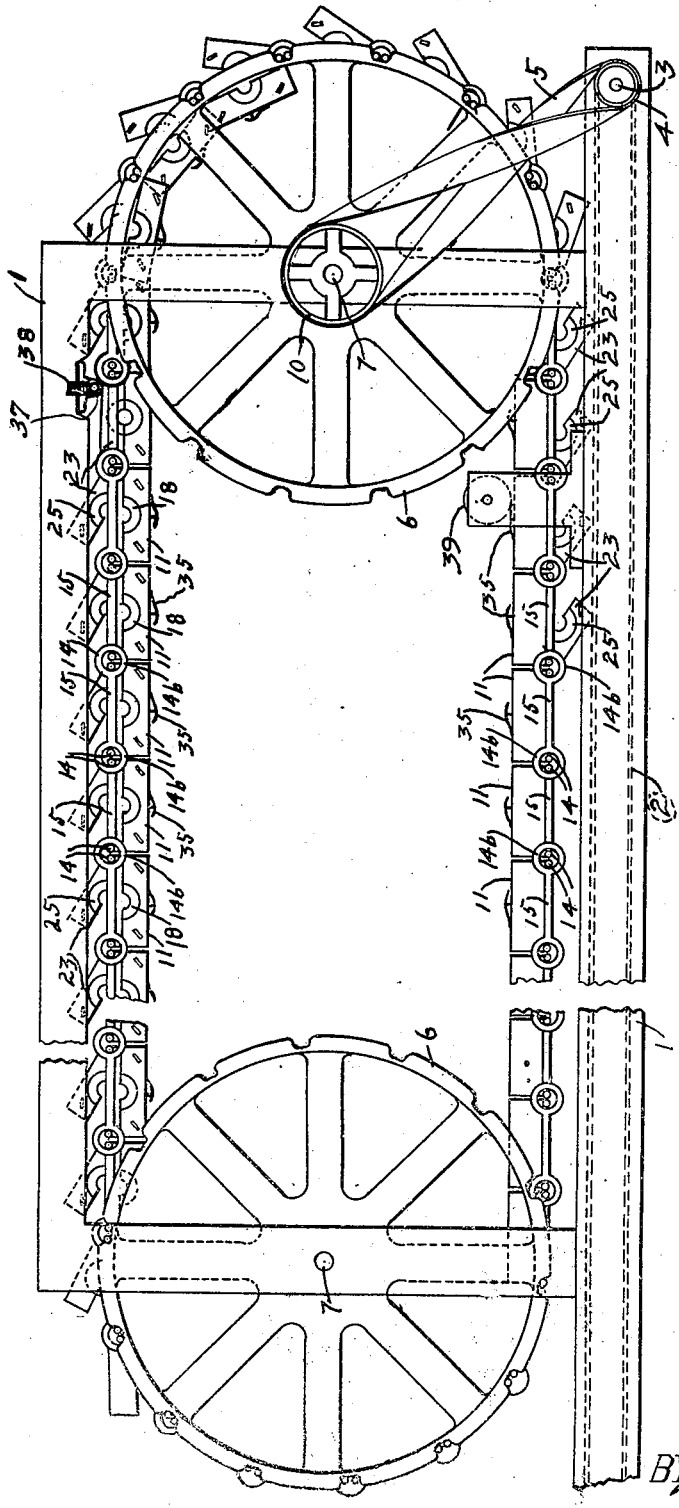
Figure 1 is a side elevation of my invention.
Figure 2:
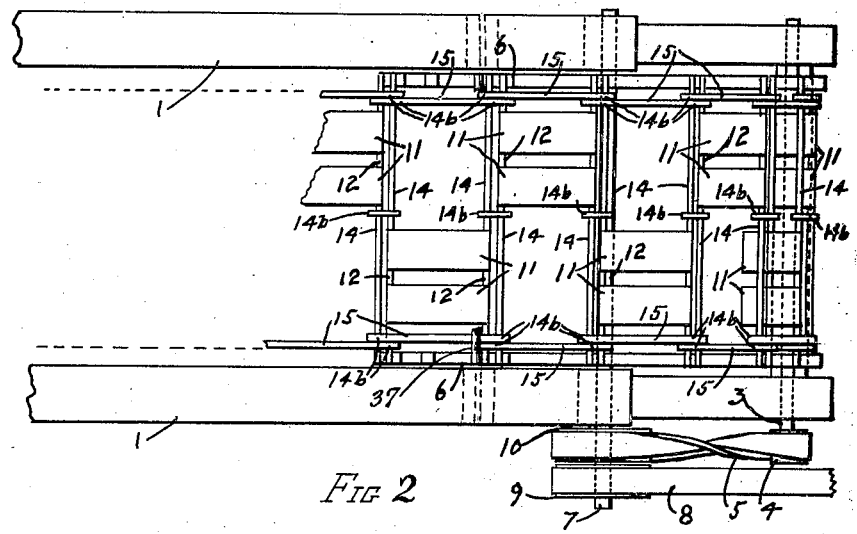
Fig. 2 is a plan view of a portion of the device shown in Fig. 1.

Referring now more particularly to the drawings, 1 indicates the several members of the supporting framework of the device having a conveyer belt 2 mounted on shaft 3 set in framework 1 and driven by pulley 4 and belt 5. At 6 are shown sprocket wheels mounted on shafts 7 revolubly mounted in framework 1, the forward wheels in this case being driven by a belt 8 from a source of power not shown, through the medium of pulley 9, a second pulley 10 being also mounted thereon to engage belt 5 for driving pulley 4.

Figure 3:
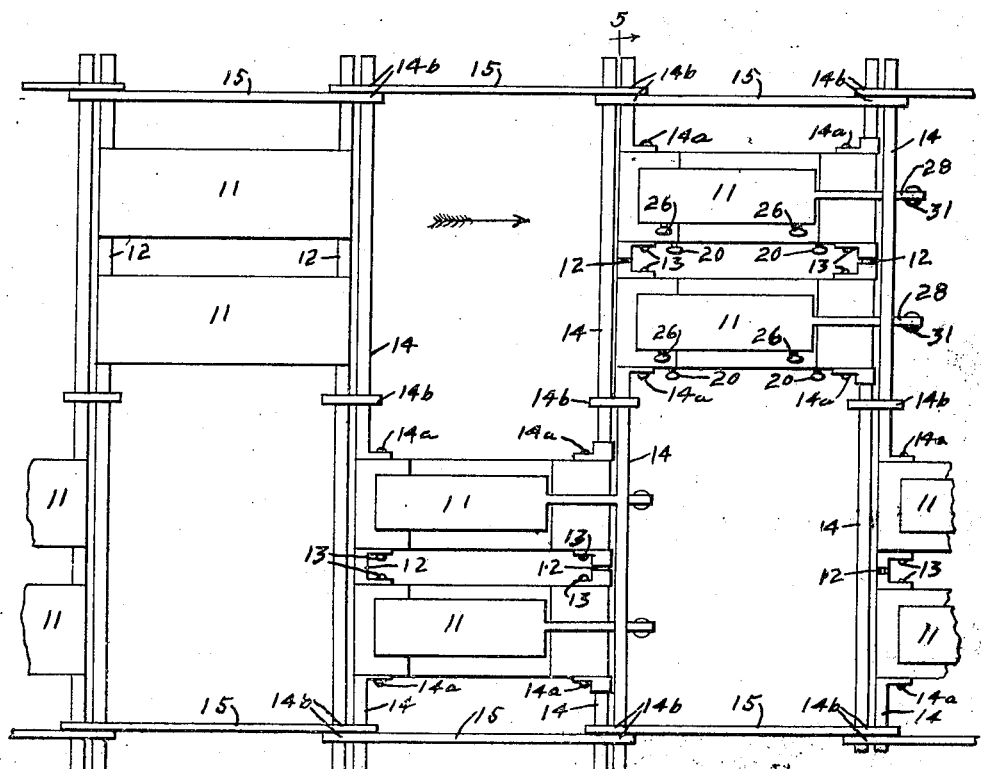
Fig. 3 is an enlarged detail plan view of a portion of the endless chain formed mainly of cutting elements.
Figure 4:
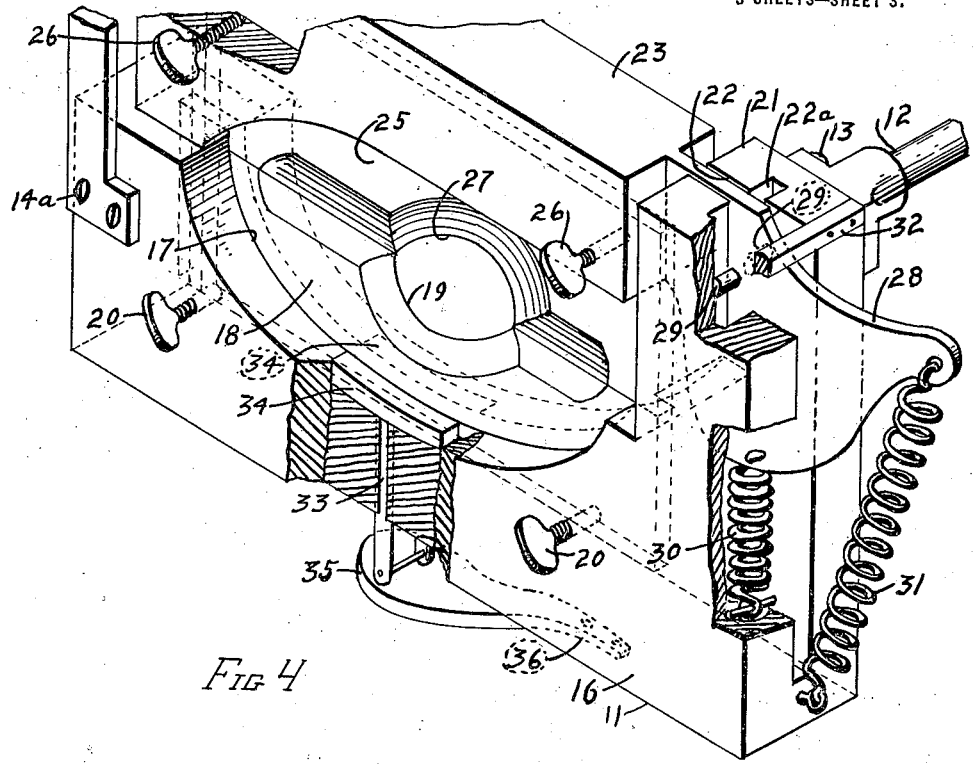
Fig. 4 is an enlarged detail perspective view of a cutting element, parts being broken away.
Figure 5:
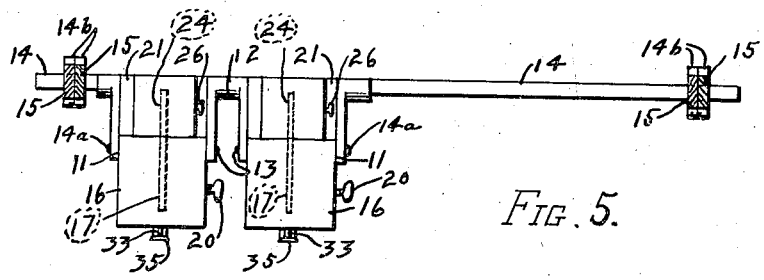
Fig. 5 is a view on line 5—5 of Fig. 3.
Figure 6:
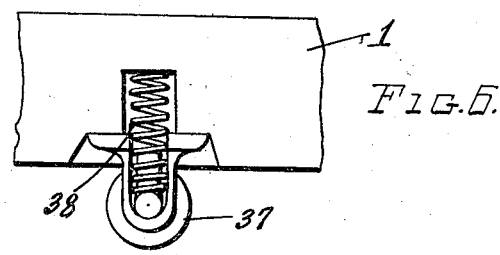
Fig. 6 is an enlarged detail of the roller mounting.

The endless chain mounted on sprockets 6 is formed of links constructed, in the present case, in the following manner. Each link is built up of cutting elements 11, these elements being bound together by means of spacing rods 12 bolted thereto as at 13 and laterally and outwardly extending rods 14 bolted thereto as at 14$^a$, the ends of the latter engaging sprockets 6. In order to provide ample room for the proper movement of elements 11 as they are carried around the ends of the device by sprockets 6, the elements of each link are offset a distance as shown clearly in Fig. 3, the contiguous rods 14 being linked together by means of rings 14$^b$, each opposing pair of rings being spaced and held by means of links 15. The elements 11 in each link are rigidly mounted with relation to each other.

Each element 11 comprises a body portion 16 formed substantially as shown and is provided with a slot 17 for receiving a blade 18 which is provided with a curved cutting edge 19 having substantially the contour of the fruit pit, the said blade being held in position by set screws 20. This body portion 16 has an upwardly extending portion 21 on its forward end having a vertical and longitudinal extending slot 22 formed therein and passing therethrough, the latter slot having opposed grooves 22$^a$ formed in the opposite walls thereof as shown. At 23 is shown a blade supporting member having a slot 24 formed in its lower surface to receive a blade 25 which is held in position by set screws 26 and is provided with a curved cutting edge as at 27. This member 23 also has a forwardly projecting arm 28 adapted to operate freely in slot 22 and provided with pins 29 adapted to engage grooves 22$^a$ as shown.

In order to compensate for the varying sizes of the fruit pits the arm 28 is connected to the body portion 16 by means of a spring 30 and is normally held in an open position with relation thereto by a spring 31 connected to the end of arm 28 and to the lower portion of member 16. The bar 32 is placed across the upper portion of the front end of member 16 to prevent the displacement of member 23 therefrom.

At 33 is shown a push rod set in member 16 and carrying a head 34 having its exposed surface flush with the surface of said member and contiguous to blade 18 and normally embedded in member 16. At its lower end it is attached to the movable end of a spring 35 which is secured to member 16 at 36. A similar mechanism is located upon the opposite side of blade 18 as indicated in dotted lines.

A roller is mounted on frame 1 and transversely thereto as shown at 37 and positioned to engage the tops of members 23 as they pass thereunder, these rollers being spring mounted as indicated at 38. On the lower portion of frame 1 is positioned a roller 39 to engage springs 35 on member 16 as the same pass thereunder.

In operation a single fruit is placed by hand on the blade 18 of each element 11. As the sprockets 6 revolve the whole series of elements move forward and the several links with the blades mounted therein pass under the roller 37 which forces the upper blade 25 down thereby cutting the fruit into two parts. As the elements pass the roller the spring 31 again raises the upper blade. The several elements move onwardly around sprockets 6 and pass in an inverted position under roller 39 which forces heads 34 out of their seats in member 16 thereby pushing the cut fruit off of the blades to fall down upon the conveyer belt 2 for removal.

It may now be seen that I have provided a machine in which the operator has only to place the fruit in position and it is automatically cut, removed from the machine and conveyed away therefrom, the capacity of the machine being determined by the facility with which the fruit may be placed upon the blades 18.

It is understood of course that changes in form, proportions, details of construction and method of operation may be made within the scope of the appended claims.

I claim:

1. A fruit cutter comprising a frame, a plurality of flexibly connected cutting elements revolubly mounted thereon, each element including a pair of opposed coöperating cutting blades, one movable with relation to the other, means for normally holding said blades in spaced relation to each other, and means for bringing said blades into a closed position with relation to each other at a given point in their revolution.

2. A fruit cutter comprising a frame, a plurality of flexibly connected cutting elements revolubly mounted thereon, each element including a pair of opposed coöperating cutting blades, one movable with relation to the other, means for normally holding said blades in spaced relation to each other, and resiliently mounted means for bringing said blades into a closed position with relation to each other at a given point in their revolution.

3. A fruit cutter comprising a frame, a plurality of flexibly connected cutting elements revolubly mounted thereon, each element including a pair of opposed coöperating cutting blades, one movable with relation to the other, means for normally holding said blades in spaced relation to each other, means for bringing said blades into a closed position with relation to each other at a given point in their revolution, fruit removing devices operatively mounted on each element, and means mounted on said frame for actuating said devices at a given point in the revolution of said elements.

4. A fruit cutter comprising a frame, a plurality of flexibly connected cutting elements revolubly mounted thereon, each element including a pair of opposed coöperating cutting blades, one movable with relation to the other, means for normally holding said blades in spaced relation to each other, means for bringing said blades into a closed position with relation to each other at a given point in their revolution, fruit removing devices operatively mounted on each element, means mounted on said frame for actuating said devices at a given point in the revolution of said elements, and a conveyer operatively mounted to receive fruit from said cutting elements and operatively connected to said revolubly mounted cutting elements to coact therewith.

5. A fruit cutter comprising an endless chain of fruit cutting elements in staggered relation to each other, each element having laterally extending supporting members contiguously positioned with relation to the preceding and following supporting members, links for securing the contiguous members together, and spaced pairs of revoluble sprockets operatively mounted to engage the opposite ends of each pair of contiguous supporting members.

6. In a device of the character indicated, a support, a frame operatively mounted to move therein in a vertical plane coincident with its longer axis, a cutting blade mounted therein longitudinally thereof, a member pivotally mounted thereon and carrying a cutting blade in opposed relation to said first mentioned blade, and means for normally holding said second mentioned blade in open relation to said first mentioned blade.

7. In a device of the character indicated, a support, a frame operatively mounted to move therein in a vertical plane coincident with its longer axis, a cutting blade mounted therein longitudinally thereof, a member resiliently and pivotally mounted therein and carrying a cutting blade in opposed relation to said first mentioned blade, and means for normally holding said second mentioned blade in open relation to said first mentioned blade.

8. In a device of the character indicated, a support, a frame operatively mounted to move therein in a vertical plane coincident with its longer axis, a cutting blade mounted therein longitudinally thereof, a member pivotally mounted therein and carrying a cutting blade in opposed relation to said first mentioned blade, and means for normally holding said second mentioned blade in open relation to said first mentioned blade, and a push rod resiliently mounted in said body portion on each side of the blade therein and provided with a head normally seated in said body portion with its outer surface flush with the surface of said body portion.

DAVID H. ELMER.